United States Patent [19]

Chalfant et al.

[11] Patent Number: 5,333,424
[45] Date of Patent: Aug. 2, 1994

[54] LOADING DOCK DOOR SEAL EXTENDER

[75] Inventors: Jeffrey R. Chalfant, Olmsted Falls, Ohio; Kenneth Harvey, Conway, Ak.

[73] Assignee: Chalfant Sewing Fabricators, Inc., Cleveland, Ohio

[21] Appl. No.: 9,649

[22] Filed: Jan. 27, 1993

[51] Int. Cl.$^5$ .............................................. E04H 14/00
[52] U.S. Cl. .................................. 52/173.2; 49/483.1; 52/2.12
[58] Field of Search ............................ 49/493.1, 475.1; 52/173.2, 2.12

[56] References Cited

U.S. PATENT DOCUMENTS

| | | |
|---|---|---|
| 181,968 | 9/1876 | Osgood . |
| 2,567,995 | 9/1951 | Eshnaur . |
| 3,181,205 | 5/1965 | Frommelt et al. . |
| 3,230,675 | 1/1966 | Frommelt et al. . |
| 3,286,417 | 11/1966 | Dazzo . |
| 3,500,599 | 3/1970 | Sciolino . |
| 3,555,734 | 1/1971 | Hirtle et al. . |
| 3,665,997 | 5/1972 | Smith et al. . |
| 3,934,380 | 1/1976 | Frommelt et al. . |
| 3,935,684 | 2/1976 | Frommelt et al. . |
| 4,015,380 | 4/1977 | Chalfant . |
| 4,038,792 | 8/1977 | McGuire et al. ............... 52/173.2 X |
| 4,495,737 | 1/1985 | Alten . |
| 4,785,594 | 11/1988 | Alten . |
| 5,174,084 | 12/1992 | Alten ............................... 52/173.2 |

Primary Examiner—Philip C. Kannan
Attorney, Agent, or Firm—Pearne, Gordon, McCoy & Granger

[57] ABSTRACT

A loading dock door seal structure wherein compressible members or pads are located adjacent the top and sides of the door to engage the rear end of a truck cargo body that is backed into loading and unloading position. The pads serve to provide a seal, however, they are spaced outwardly away from the wall of the building adjacent the door frame to leave gaps. Brackets are provided at the top and sides of the door frame and secured thereto, but extend outward and have lateral legs parallel to the building wall that serve as a mount for the seal pads. The brackets also have longitudinal legs extending perpendicular to the doorframe and outwardly therefrom in the gap between the pads and the doorframe. Flexible fabric seal strips are secured to the longitudinal legs of the bracket to close the gaps between the pads and the wall building.

4 Claims, 3 Drawing Sheets

LOADING DOCK DOOR SEAL EXTENDER

BACKGROUND OF THE INVENTION

This invention relates to seal structures for loading docks whereat a cargo body of a truck or trailer is backed against the doorway at the dock, and especially to a resilient seal structure surrounding the top and sides of the doorway and engageable with the rear end of the cargo body to provide a seal against rain and cold during loading and unloading operations.

More particularly, the invention relates to a loading dock structure whereat the end of the cargo body is horizontally spaced away from the top and sides of the door opening due, for example, to the installation of a vertically adjustable platform interposed between the floor of the dock and the floor of the truck. This arrangement requires that the seal structure be spaced away from the doorway to sealingly engage the end of the cargo body.

In prior art, loading dock door seals such as the seal arrangement shown in U.S. Pat. No. 4,015,380 dated Apr. 5, 1977, the floor of the loading dock extends only through the door itself and not significantly beyond. The seal structure is located on the exterior of the door frame facing outward. When the cargo body is backed against the seal, the seal may be compressed somewhat but the floor of the truck is closely spaced to the floor of the dock itself. Ramps may, of course, be used for loading and unloading cargo to and from the cargo body.

This arrangement, however, is not satisfactory in the case of newer cargo body designs wherein a vertically adjustable platform is often provided at the end of the cargo body to facilitate the loading and unloading operation. These platforms are often operated hydraulically and are interposed between the dock itself and the floor of the cargo body.

It will be apparent that with this configuration, it is not possible to move the truck cargo body far enough back to engage a prior art loading dock door seal of the type described, due to the interference caused by the adjustable platform.

The loading dock door seal arrangement of the present design provides a means for extending the seal structure of the type described in U.S. Pat. No. 4,015,380 sufficiently outward away from the doorway to permit engagement with the cargo body while providing sufficient space to accommodate an adjustable platform. At the same time, the means for extending the seal structure provides its own means for enclosing the space between the seal itself and the doorway.

SUMMARY OF THE INVENTION

In accordance with the present invention, a loading dock door seal structure is supported along the outside top and side surfaces adjacent a loading dock doorway of a warehouse or the like. The seal structure includes a top member and two side members to sealingly engage the top and sides of the end of a truck cargo body backed into loading and unloading position relative to the dock.

A ramp or platform is provided between the floor of the truck and the floor of the dock and is adapted for vertical adjustment to register with the floor of the dock.

In accordance with the invention, the seal structure is supported in a position spaced from the plane of the building wall adjacent the loading dock doorway to provide top and side spaces. The support is provided by means of a plurality of brackets, each having two perpendicular legs including a longitudinal leg and a lateral leg. A diagonal brace is provided between the two legs.

The longitudinal leg has an inward extension that is placed against the side edge of the doorway with the lateral leg extending outwardly. The extending portion is secured to the door frame by means of leg screws or the like. The laterally extending legs of the brackets provide a means for mounting the seal structures to include both the top structure and the side seals. The space between the seals and the doorframe is closed by means of flexible sheet material secured to the inside surfaces of the longitudinally extending legs of the brackets so as to seal the gap, thus provided between the cargo body and the interior of the building in which the loading dock doorway is located.

DESCRIPTION OF PREFERRED EMBODIMENT

Figure 1:
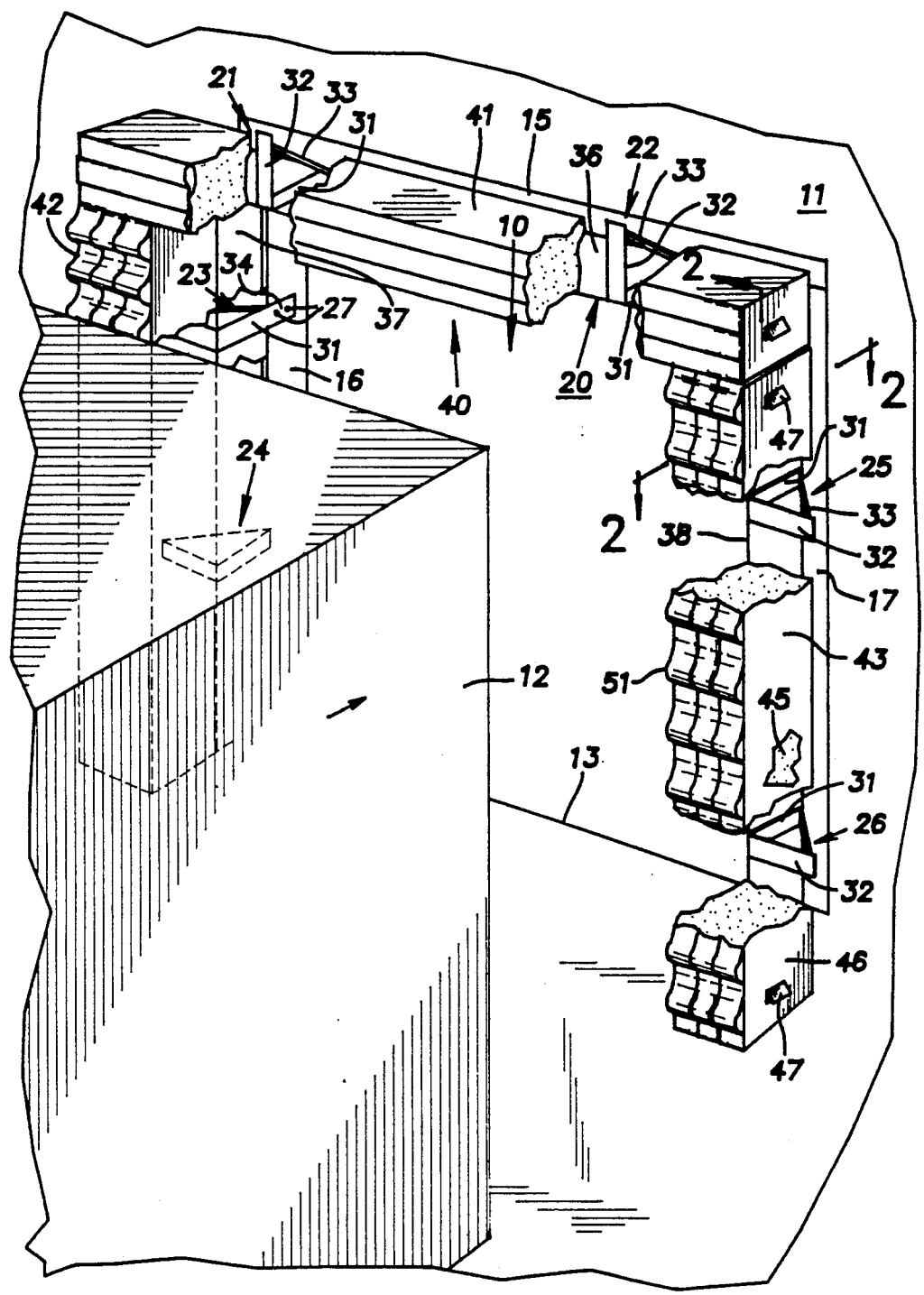
FIG. 1 a perspective view of a loading dock having a door seal and extender, therefor, in accordance with the invention. A truck cargo body is shown spaced from the loading dock in a position preparatory to engagement with the seal.
Figure 2:
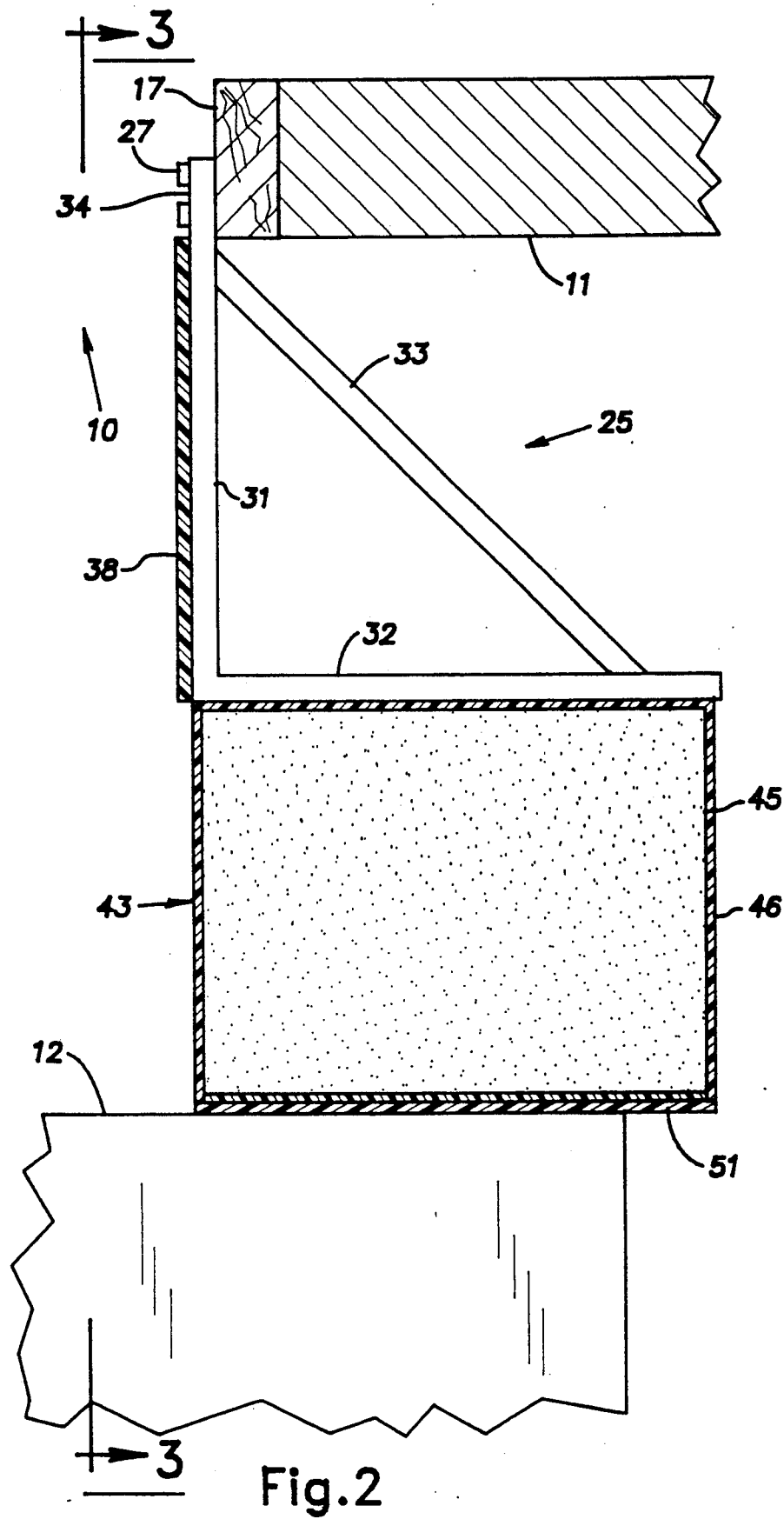
FIG. 2 is a horizontal sectional view taken midway between the top and bottom of the loading dock doorway.

Referring more particularly to the drawings, FIG. 1 shows a doorway 10 in an outside wall of a warehouse 11 or the like, at a docking station whereat the cargo body 12 of a truck or trailer is backed into an loading and unloading position. The floor 13 beneath the doorway 10, (i.e. the floor of the dock), is located at a level that may or may not correspond the floor of the cargo body 12 to facilitate the loading and unloading of cargo. Accordingly, an adjustable platform 14 is provided on the cargo body to accommodate different levels of the floor 13 of the dock.

The doorway 10 is defined by a horizontal top member 15 and parallel side members 16 and 17 which provide a frame for the door. The frame is generally constructed of wood to facilitate anchoring of various seal components.

In accordance with the invention, a seal structure is provided that includes an extension assembly 20 and a seal assembly 40. The extension assembly 20 comprises a pair of top brackets 21 and 22, a pair of left side brackets 23 and 24 and a pair of right side brackets 25 and 26. The brackets are essentially identical and the top brackets 21 and 22 are mounted to the top member 15 of the doorframe. The left side brackets 23 and 24 are secured to the side member 16 of the doorframe and the right side brackets 25 and 26 are secured to the side member 17 of the doorframe as illustrated. The brackets may be secured, for example, using leg screws 27.

As indicated above, the brackets 21, 22, 23, 24, 25 and 26 are essentially identical and are formed of steel bar members welded together to provide a longitudinal leg 31, a lateral leg 32 and a diagonal brace 33 that connects the outer end portions of the legs. The point of connection for the diagonal brace 33 is spaced inwardly from the outer ends of the legs 31 and 32 so that portions of each leg extend outwardly beyond the diagonal brace 33.

The longitudinal leg 31 of each of the bracket has an extended mounting portion 34 that is provided with holes to permit the bracket to be secured to its respective position in the doorway frame using the leg screws 27. As illustrated, the brackets are all mounted with their lateral leg extending outwardly away from the doorway 10.

The longitudinal legs 31 of each of the brackets provide a means for supporting a top strip 36 and two side strips 37 and 38 to seal the gap between the outer wall of the warehouse and the seal structure 40. The top strip 36 is supported on the top brackets 21 and 22 and located in a horizontal plane adjacent the top member 15 of the doorframe. The side strip 37 is supported by the brackets 23 and 24 to seal the gap between the seal structure 40 and the left side member 16 of the doorframe. The side strip 38 is supported by the brackets 25 and 26 to seal the gap between the seal structure 40 and the right side member 17 of the door frame. The strips are formed of any suitable flexible fabric material or the like, preferably vinyl sheet material.

The strips 36, 37 and 38 may be secured to the longitudinal legs 31 and to other parts of the door frame structure in a variety of different ways as will be readily apparent to those skilled in the art.

The outwardly facing surfaces of the lateral legs 32 provide faces to which the elements of the seal assembly 40 may be mounted. The seal assembly 40 includes a top section 41 extending parallel to the top member 15 of the door frame and spaced therefrom, and two parallel side sections 42 and 43 which extend parallel to one another as well as parallel to the side members 16 and 17 respectively. It will be seen that the seal sections 41, 42 and 43 are spaced from the door frame to provide gaps therebetween.

Figure 3:
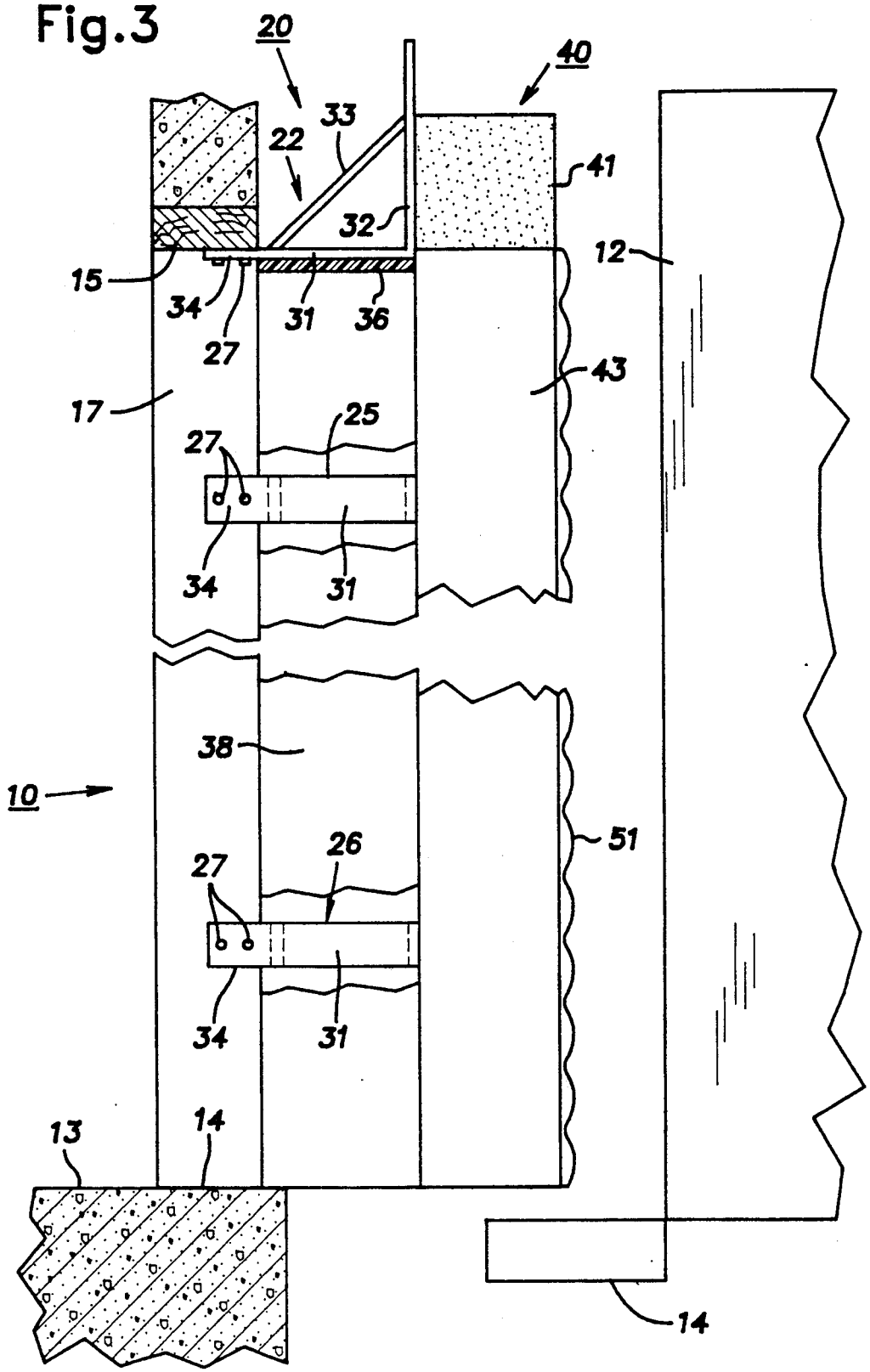
FIG. 3 is a vertical sectional view taken on the line 3—3 of FIG. 2.

Each of the seal sections 41, 42 and 43 comprises an elongated block of compressible material such as foam rubber 45, for example, covered by a layer 46 of flexible plastic sheet material to protect the foam block and assist in forming a seal. Air vents 47 are provided at each end of the sections 41, 42 and 43 to permit escape and entry of air during compression and expansion respectively. The side sections 42 and 43 may be provided with an additional cover strip 51 which is sewn to the plastic sheet material along horizontal seams at spaced locations in such a way as to form bulges as illustrated in FIGS. 1 and 3. The bulges are formed in the manner described in U.S. Pat. No. 4,015,380.

It will be seen that with this structure, a seal is provided between the rear end of the cargo body 12 and the doorway 10 to shelter the cargo and workers during loading and/or unloading operation, while at the same time, providing sufficient space for the vertically adjustable platform 14. It will be readily apparent that as cargo is unloaded, a substantial load is removed from the cargo body and as a result of the drastically reduced weight on the springs of the cargo body, the body moves vertically in an upward direction relative to the doorway. This movement may be as much as two or three inches.

It will also be apparent that loading dock doorways provided with seals that accommodated older cargo bodies that have no vertically adjustable platform may be readily changed to accommodate the extension assembly provided by the invention without the need to purchase an entirely new seal assembly 40. The modification can be accomplished conveniently and with relatively little expense using the brackets 21, 22, 23, 24, 25 and 26 and the associated enclosure sheets 36, 37 and 38 with little loss in time and usage of the loading dock doorway.

While the invention has been shown and described with respect to a preferred embodiment thereof, this is intended for the purpose of illustration rather than limitation and other variations and modifications in the specific embodiment herein shown and described will be apparent to those skilled in the art all within the intended spirit and scope of the invention.

Accordingly, the patent is not to be limited in scope and effect to the specific embodiment herein shown and described nor in any other way that is inconsistent with the extent to which the progress in the art has been advanced by the invention.

What is claimed is:

1. In a loading dock seal structure supported along the outside top and sides of a door frame adjacent a loading dock doorway, said structure including a top member and two parallel side members to sealingly engage the top and sides of the end of a truck cargo body backed into loading and unloading position relative to said doorway, the improvement which comprises means for supporting the seal structure in a position spaced from the plane of the outside wall adjacent the doorway, said means including a plurality of brackets, at least two of which are attached to each of the top and sides of the door frame each bracket having a longitudinal leg and a lateral leg perpendicular to the longitudinal leg, the longitudinal leg extending perpendicular to the doorway and outwardly therefrom and the lateral leg extending outwardly parallel to the outside wall adjacent the doorway from the outward end of the longitudinal leg, the lateral legs being adapted to support the top member and side members in their respective position to engage the truck cargo body, and a top seal strip and two side seal strips attached to the longitudinal legs of said brackets to close and seal the gaps defined by the space between the top and side members of the seal structure and the doorway of the loading dock.

2. A seal structure support as defined in claim 1 wherein said longitudinal leg of said brackets has an outer length portion that is fastened to the door frame.

3. A seal structure support as defined in claim 2 wherein said brackets are formed of metal bar stock of generally rectangular cross section.

4. A seal structure support as defined in claim 3 wherein each bracket has a diagonal brace extending between said longitudinal leg and said lateral leg.

* * * * *